United States Patent [19]

Kiely et al.

[11] Patent Number: 5,434,233
[45] Date of Patent: Jul. 18, 1995

[54] POLYALDARAMIDE POLYMERS USEFUL FOR FILMS AND ADHESIVES

[76] Inventors: Donald E. Kiely, 2521 Chatwood Rd., Birmingham, Ala. 35226; Liang Chen, 4010 N. Brandywine Dr., #620, Peoria, Ill. 61614; David W. Morton, 716-F 24th Ave. NW., Birmingham, Ala. 35215

[21] Appl. No.: 248,189

[22] Filed: May 24, 1994

Related U.S. Application Data

[63] Continuation-in-part of Ser. No. 927,913, Aug. 12, 1992, abandoned.

[51] Int. Cl.$^6$ .................... C08G 69/26; C08G 69/40
[52] U.S. Cl. ......................... 527/310; 527/312; 528/335; 528/337; 528/338; 528/340; 528/341; 528/342
[58] Field of Search ............... 527/312, 310; 528/335, 528/337, 338, 340, 341, 342

[56] References Cited

U.S. PATENT DOCUMENTS

| | | | |
|---|---|---|---|
| 2,158,064 | 5/1939 | Carothers | 528/335 |
| 2,359,867 | 11/1941 | Martin | 528/340 |
| 4,833,230 | 5/1989 | Kiely | 528/230 |
| 5,053,484 | 10/1991 | Speranza | 528/335 |
| 5,086,162 | 2/1992 | Speranza | 528/335 |
| 5,118,785 | 6/1992 | Speranza | 528/335 |
| 5,312,967 | 5/1994 | Kiely | 560/180 |
| 5,324,812 | 6/1994 | Speranza | 528/335 |
| 5,329,044 | 7/1994 | Kiely | 528/335 |

OTHER PUBLICATIONS

F. W. Billmeyer, "Textbook of Polymer Science", 2nd ed., Wiley Interscience, New York, pp. 224–225, 229 & 230 (1971).

*Primary Examiner*—John C. Bleutge
*Assistant Examiner*—D. R. Wilson
*Attorney, Agent, or Firm*—Stephen Gates; Glenna Hendricks

[57] ABSTRACT

Polymers of glucaric or xylaric acid with diprimary amines containing at least one heteroatom in the main chain form films when cast from aqueous solution and show adhesive properties. Unexpectedly, analogous polymers prepared using galactaric acid, an isomer of glucaric acid, do not form satisfactory films when cast from aqueous solution and exhibit poor or no adhesive properties. Copoly(aldaramides) comprising galactaric acid residues and either glucaric acid or xylaric acid residues, when prepared by reacting an equivalent weight of an activated galactarate with a product formed by reaction of two equivalents of a diprimary heterohydrocarbylenediamine with one equivalent of either an activated xylarate or glucarate also afford film-forming polymers which exhibit adhesive properties.

10 Claims, No Drawings

POLYALDARAMIDE POLYMERS USEFUL FOR FILMS AND ADHESIVES

This application is a continuation-in-part of U.S. patent application Ser. No. 07/927,913, filed Aug. 12, 1992, now abandoned.

The present invention is directed to polymers and copolymers of aldaric acids with heterohydrocarbylenediamines and hydrocarbylenediamines.

BACKGROUND OF THE INVENTION

Kiely & Lin in U.S. Pat. No. 4,833,230, incorporated herein in its entirety by reference, describe polyhydroxypolyamides prepared from aldaric acids and alkylenediamines, and in particular poly(alkylene glucaramides), as for example, poly(hexamethylene glucaramide) from glucaric acid. Such polymers based on glucose are of particular interest because of the ready availability and low cost of glucose. Other polymers are described in copending application U.S. Ser. No. 07/927,914, "An Improved Process for Making Aldarate Esters, Ester/lactones and Lactones", filed Aug. 12, 1992, now U.S. Pat. No. 5,312,967, and incorporated herein in by reference in its entirety. The patent and application describe processes in which various aldaric acids or their derivatives are converted to "activated aldarates" which are then polymerized with primary alkylenediamines to yield poly(alkylene aldaramides).

Polymers having film-forming and/or adhesive properties are desirable for a myriad of uses. The polymers of Kiely & Lin made with straight-chain diamines do not form satisfactory cast films from aqueous solutions and have poor or no adhesive properties, but polymers of 2-methylpentamethylenediamine with glucaric or xylaric acid such as are described in U.S. Pat. No. 4,833,230 now have been found to be film-forming and to exhibit adhesive properties.

Therefore it is clear that a greater variety of film-forming polyaldaramides having adhesive properties would be desirable.

SUMMARY OF THE INVENTION

It now has been found that polymers of glucaric or xylaric acid with diprimary amines containing at least one heteroatom in the main chain form good films when cast from aqueous solution and show adhesive properties. Unexpectedly, analogous polymers prepared using galactaric acid, an isomer of glucaric acid, do not form satisfactory films when cast from aqueous solution and exhibit poor or no adhesive properties.

It also has been found that copoly(aldaramides) comprising galactaric acid residues and either glucaric acid or xylaric acid residues, when prepared by reacting an equivalent weight of an activated galactarate with a product formed by reaction of two equivalents of a diprimary heterohydrocarbylenediamine with one equivalent of either an activated xylarate or glucarate also afford film-forming polymers which exhibit adhesive properties.

DETAILED DESCRIPTION OF THE INVENTION

It unexpectedly has been found that although polymers of galactaric acid with diprimary amine monomers containing heteroatoms such as —O— or —N— in the chain are not film-forming and show poor or no adhesive properties, film-forming polymers which exhibit good adhesive properties may be obtained by reacting activated glucarates or xylarates with diprimary amine monomers containing heteroatoms such as —O— or —N— in the chain. Further, it also has been found that although polymers made using only an activated galactarate as the source of aldarate residues do not have film-forming or adhesive properties, polymers prepared using an activated galactarate in admixture with an activated glucarate or xylarate with diprimary amine monomers containing heteroatoms such as —O— or —N— in the chain do possess the desired properties. The inclusion of diprimary amine residues having heteroatoms in the chain also significantly increases water solubility of the resulting polymers. In addition, when the polymers contain nitrogen (or phosphorus) atoms in the chain, solubility may be further affected by conversion of the nitrogen or (phosphorus) atoms to ammonium, quaternary ammonium (or phosphonium) groups. In still another variation, the solubility characteristics of polymers may be varied further by preparing them from mixtures of two or more amines, of which at least about half have heteroatoms in the main chain and the remainder may have only hydrocarbon residues in the main chain. The appropriate mixture of diprimary amine monomers to obtain the desired balance of properties may be determined by routine experimentation.

In summary, poly(galactaramides) which include heteroatoms in their diamine component(s) do not form films when cast from aqueous solution, but polyglucaramides and polyxylaramides which include heteroatoms in the diamine component(s) of the polymer do form clear films when cast from an aqueous solution and have good adhesive properties. Co(polyamides) of xylaric and glucaric acid which comprise up to about 50% galactaric acid residues also are film-forming and have adhesive properties.

The polymers of the invention are random polymers and copolymers having the general formula:

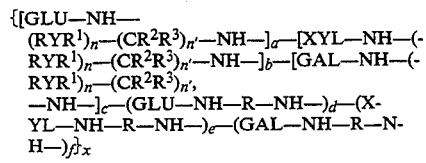

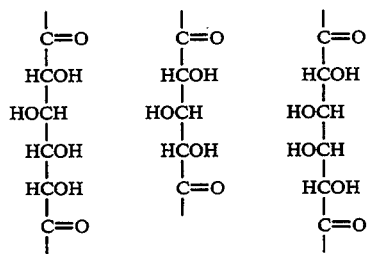

each of a, b and c may be zero and the sum a+b+c must be greater than zero, with the proviso that the value of c cannot be greater than the sum a+b;
each of d, e and f may be zero and the sum d+e+f must be no greater than the sum a+b+c;
each individual n is individually at least 1;
each individual R is selected individually from the group of divalent radicals consisting of alkylene, alkenylene, aryl- and alkyl-substituted alkylene and alkenylene, and —R$^4$-(arylene)-R$^4$— and —R$_4$-(alkyl- and alkenyl-substituted arylene)-R$^4$—, where each individual R$^4$ is individually selected from the group consisting of alkylene having from 1–4 carbon atoms;

each individual R$^1$ is selected individually from the group consisting of R or a valence bond;

each individual R$^2$ and R$^3$ is selected individually from the group consisting of hydrogen, alkyl, alkenyl, alkynyl, aryl, aryl-substituted alkyl and alkenyl, and alkyl- and alkenyl-substituted aryl;

each individual n' may individually be zero or an integer with the proviso that when R$^1$ is a valence bond n' must be at least two;

each individual Y is selected individually from the group consisting of —O—, —S—, —NR$^5$—, and —PR$^5$, wherein each individual R$^5$ is selected individually from the group consisting of hydrogen, alkyl, alkenyl, aryl, aralkyl and alkaryl; and x is a number between about 10 and 1,000 or more.

The polymers of the invention may be prepared using any of the processes described in the aforementioned U.S. Pat. No. 4,833,230 and as well as that described in the copending U.S. patent application Ser. NO. 07/928,007, "Glucaric Acid Monoamides and their Use to Prepare Poly(glucaramides)" filed Aug. 12, 1992, now U.S. Pat. No. 5,329,044, and incorporated herein in its entirety by reference.

Co- and higher polymers of the invention may be prepared by reacting one or more activated aldarates with one or more diprimary amines, optionally with additional minor amounts of tri- or higher polyamines.

When polymers are prepared which include more than one kind of aldaric acid residue it is preferred to conduct the polymerization in a stepwise fashion. If an activated xylarate and glucarate or galactarate are to be the monomers, all of the amine is reacted with the xylarate, and then the activated glucarate or galactarate is added when the first reaction has proceeded to near completion. If an activated glucarate and galactarate are the monomers, the glucarate is reacted first. When all of the aldarates are reacted with the amine(s) at the same time there is a strong probability that the polymer formed by one of the aldarates will precipitate out of the reaction mixture before much if any of the other has reacted, which results in formation of extremely heterogeneous polymers, and in extreme cases what amounts to the formation of a mixture of the two homopolymers.

Activated aldarates suitable for use in preparing the polymers of the invention include, but are not limited to lower alkyl esters, ester-lactones and lactones of glucaric and xylaric acids. Esters of galactaric acid are usually employed when preparing the galactaramide copolymers of the invention.

Primary heterohydrocarbylenediamines suitable for use as the principal amine component in the preparation of the polymers of the invention are diamines and polyamines in which the primary nitrogen atoms are bound to aliphatic carbon atoms. The heterohydrocarbylenediamines are diprimary amines having the general formula H$_2$N—(RYR$^1$)$_n$—(CR$^2$R$^3$)$_{n'}$—NH$_2$, wherein each individual n is individually at least 1, each individual R is selected individually from the group of divalent radicals consisting of alkylene, alkenylene, aryl- and alkyl-substituted alkylene and alkenylene, and —R$^4$-(arylene)-R$^4$— and —R$^4$-(alkyl- and alkenyl-substituted arylene)-R$^4$—, where each individual R$^4$ is selected individually from the group consisting of alkylene having from 1–4 carbon atoms, each individual R$^1$ is selected individually from the group consisting of R or a valence bond;

each individual R$^2$ and each individual R$^3$ is selected individually from the group consisting of hydrogen, alkyl, alkenyl, alkynyl, aryl, aryl-substituted alkyl and alkenyl, and alkyl- and alkenyl-substituted aryl;

each individual n' may be zero or an integer with the proviso that when R$^1$ is a valence bond n' must be at least two; and each individual Y is selected individually from the group consisting of —O—, —S—, —NR$^5$—, and —PR$^5$—, wherein each individual R$^5$ is selected individually from the group consisting of hydrogen, alkyl, alkenyl, aryl, aralkyl and alkaryl.

Examples of such diamines include but are not limited to heteroalkylenediamines such as polyoxyethylenediamines, polyoxypropylenediamines, 4-aza-4-octylheptamethylenediamine, 4-phospha-4-ethylheptamethylenediamine, polythioethylenediamines and the like. Minor amounts of higher functionality primary amines may be added to introduce branching in the polymer. Useful higher functionality amines include but are not limited to the polyoxypropylenetriamines (Jeffamine T403, sold by Texaco is an example) and tetrakis-(aminomethyl)methane. Care must be taken to avoid adding so much higher functionality that gelation of the polymer will occur. The amount needed to obtain the desired degree of branching may be determined by routine experimentation.

Diprimary hydrocarbylenediamines useful as lesser components of the polymers of the invention have the general formula

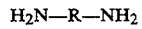

H$_2$N—R—NH$_2$ wherein each individual R is selected individually from the group of divalent radicals consisting of alkylene, alkenylene, aryl- and alkyl-substituted alkylene and alkenylene, and —R$^4$-(arylene)-R$^4$— and —R$^4$-(alkyl- and alkenyl-substituted arylene)-R$^4$—, where each individual R$^4$ is selected individually from the group consisting of alkylene having from 1–4 carbon atoms. Examples of diprimary hydrocarbylenediamines include but are not limited to alkylenediamines such as ethylenediamine, hexamethylenediamine, 2-methylpentamethylenediamine, 2-phenyltetramethylenediamine and the like; aralkylenediamines such as o-, m- and p-xylylenediamine, ar-alkyl substituted xylylenediamines and the like.

New developing uses of the polymers include use as films for industrial, agricultural, pharmaceutical, medicinal, health care and personal care purposes. Film forming uses include biodegradable films for disposable health care products (e.g. disposable diapers, sanitary napkins and other biological fluid absorbents), biodegradable disposable packaging materials, biodegradable disposable trash bags. Developing uses also include use as chemicals/polymers in the manufacture of paper. Some new uses for the polymers in textiles include as antistatic agents in textiles for manufacturing fabrics with antistatic characteristics, as hydrophilic fibers and/or components of hydrophilic fibers, as water permeable nylons and/or components of water permeable nyions, polyesters and polyacrylonitriles and/or other common synthetic polymers for manufacture of water permeable fabrics and/or membranes. The polymers can also have use as components of biodegradable agriculture mulches, biodegradable time release fertilizers, biodegradable encapsulation materials for chemical agents used in agriculture [agricultural biocides in general (including pesticides and plant virucides)], fertilizers and other agricultural chemical agents where time release is important for best use. Other developing uses of the polymers include in adhesives, industrial and municipal water treatment (e.g. biodegradable flocculating agents and materials for concentration of heavy metal ions) and biodegradable absorbent materials for use in human fluid absorption (urine and blood). Some polymers applications employ uses (from above and others) of the polymers physically or chemically combined with other materials such as biopolymers (starch and/or derivatives, cellulose and/or derivatives, guar and/or derivatives, chitin and/or derivatives and other common industrial polysaccharides and/or derivatives), synthetic polymers (nylons, polyacrylic acid and/or derivatives, polyethylene and polypropylene and/or derivatives and other common synthetic polymers). The biodegradable polymers can also contain photodegradable segments rendering polymers with both photo- and biodegradable characteristics. Such polymers can be employed for purposes (from above and others) that would take advantage of both characteristics. Other uses of the polymers are as biocides and pesticides in agricultural, specialty industrial membranes and biomembranes, components of cosmetic products [e.g. polymeric quaternary ammonium salts and/or polymers with amphoteric nitrogens (i.e. zwitter ionic) in the polymer, emulsifiers, softeners etc.], polymers or derivatives for use as chromatographic column materials in general and in particular for separating racemic mixtures (e.g. racemic drug mixtures, drugs, bioactive compounds and others) into component enantiomers. The polymers can also serve as surfactants and detergents and as other functional components (e.g. builders, softeners and others) in detergent preparations. Additional uses will be possible because of the chirality of the polymers, particularly in non-linear optical materials.

EXPERIMENTAL

General methods. All $^1H$ and $^{13}C$ NMR were recorded with a GE 300WB FT-NMR spectrometer at 300.13 MHz and 75.4 MHz. Chemical shifts are reported as ppm ($\delta$) downfield from tetramethylsilane (TMS) or 2,2,3,3-tetradeuterio-3-trimethylsilyl propionate (TSP). IR spectra were recorded with a Nicolet IR42 FT IR spectrometer, as KBr pellets. All solvents used were reagent grade unless stated otherwise. Melting points were recorded with Fisher-Johns Melting Point Apparatus and are reported uncorrected. Solvent evaporations were carried out in vacuo. Methanol-diamine solutions were standardized by diluting an aliquot of the solution with water and titrating with standardized hydrochloric acid, using a pH meter as a monitor to obtain a titration curve and determining the end point from the curve.

The following examples are provided to demonstrate the present invention. Because the examples are for illustrative purposes only, the invention should not be limited thereby.

EXAMPLE A

Preparation of methyl D-glucarate 1,4-lactone.

a. (from monopotassium D-glucarate): The acid form of a cation exchange resin (REXYN 101(H), Fisher) was washed with methanol until the washings were colorless. Methanol (200 mL), the above treated resin (105 mL) and monopotassium D-glucarate (D-saccharic acid monopotassium salt, 50.0 g, 201.5 mmol) were added successively to a 1000 mL Erlenmeyer flask. The flask was sealed, placed in a shaker/water bath (Precision Scientific Co.) at a water bath temperature of 50° C. and was shaken until the white saccharic acid salt was completely dissolved (about 3 h). The resin was removed by filtration, washed with methanol (2×15 mL) and retained for regeneration to its acid form. The combined filtrate and washings were transferred to a 500 mL round-bottomed flask and concentrated to a thick syrup. The syrup, seeded with pure methyl D-glucarate 1,4-lactone, solidified at room temperature in two-three days. The solid cake was dried further at room temperature (0.25 torr) for 36 h to give a slightly yellow solid (29.4 g, 143 mmol, 71.5%) which could be used directly for polymerization. Triturating the crude solid at room temperature with ethanol gave a white solid which was separated by filtration and dried at reduced pressure (0.25 torr) and 65° C. for 12 h: yield of purified methyl D-glucarate 1,4-lactone, 20.89 g (101.3 mmol, 50.8%): mp 158°–160° C. (lit. 165° C.; Smith, *J. Chem. Soc.*, 632 (1944)).

b. (from monopotassium D-glucarate): Monopotassium D-glucarate (20.00 g, 80.61 mmol) was added to a 250 mL round-bottomed flask containing methanol (100 mL). A solution of methanolic HCl prepared by careful addition of acetyl chloride (20 mL, 276 mmol, 98%, Aldrich) to methanol (25 mL) kept at ice bath temperature was added to the mixture. The reaction mixture was refluxed for 3–4 h, an insoluble white solid being observed in the reaction vessel during the entire refluxing time. The solid was separated by filtration and dried in a vacuum oven for 12 h at 70° C. The melting point of the solid was greater than 250° C. and the solid gave no $^1H$ NMR signal (D$_2$), properties consistent with KCl, the inorganic by-product from the reaction; yield 5.386 g (72.24 mmol, 89.62%). The filtrate was concentrated at 50° C. to give a syrup which was seeded with pure methyl D-glucarate 1,4-lactone. The syrup, when kept at room temperature, solidified and was dried at reduced pressure (0.25 torr) for 24 h to complete the crystallization: yield of crude solid methyl D-glucarate 1,4-lactone, 16.52 g. The combined weight of solid KCl and solid methyl D-glucarate 1,4-lactone was 21.91 g (96.80% of theoretical). The residual inorganic salt was removed in the following way. H$^+$form cation exchange resin (10 mL) was added to solid methyl D-glucarate1,4-lactone (16.52 g) which had been dissolved in methanol (50 mL). The mixture was stirred at room temperature (3 h) and the resin was removed by filtration. The filtrate was concentrated to a syrup which solidified spontaneously. The solid was triturated with acetone, separated by filtration and dried in a vacuum oven at 70° C. for 8 h to give methyl D-glucarate 1,4-lactone (9.79 g, 47.47 mmol, 58.89%).

EXAMPLE B

Preparation of ethyl D-glucarate 6,3-lactone.

Acid form cation exchange resin (110 mL, REXYN 101(H), Fisher) was washed with ethanol until the washings were colorless. The ethanol washed resin, monopotassium D-glucarate (50.00 g, 201.5 mmol, Sigma) and ethanol (200 mL) were added to a 1000 mL Erlenmeyer flask. The flask was sealed and put in a shaker/water bath at 55° C. for 4 h or until the white solid was dissolved. The resin was removed by filtration and washed with ethanol (3×10 mL) and the combined filtrate and washings were concentrated to give a thick syrup. The syrup was seeded with ethyl D-glucarate 6,3-lactone and kept for two-three days at room temperature by which time most of the syrup solidified. The sticky cake was then kept under vacuum (0.25 torr) for three days at room temperature to yield solid and slightly yellow crude ethyl D-glucarate 6,3-lactone (26.81 g, 121.8 mmol, 60.45%). Trituration of this solid with acetone followed by filtration gave a white solid product. The acetone filtrate was concentrated and the resulting solid triturated and separated as above. The combined white solids were dried in a vacuum oven at 55° C. for 6 h to give ethyl D-glucarate 6,3-lactone (25.83 g, 117.3 mmol, 58.2%): mp 121°-123° C. (lit. 122° C.; Zinner and Fischer, *Chem. Ber.*, 89, 1503 (1956)).

EXAMPLE C

Poly (4-aza-4-methylheptamethylene galactaramide).

To methanol (100 mL) was added dimethyl galactarate (10.0 g, 42.0 mmol) and 4-aza-4-methylheptamethylene, (3,3'-diamino-N-methyldipropylamine, Aldrich, 1. 528M, 27.5 mL, 42.0 mmol). The reaction mixture was refluxed for 4 h. The precipitate was removed by filtration, washed with fresh methanol (2×10 mL) and dried under vacuum to give 13.0 g (97%) of poly (4'-aza-4'-methylheptamethylene galactaramide) as a white amorphous powder: mp 220° C. (decomp); IR (KBr) 3293 cm$^{-1}$ (broad, O—H and N—H stretch), 2950 (C—H stretch), 1642 (Amide I, C=O stretch) , 1549 (Amide II, C=O stretch); $^1$H NMR (D$_2$O) 4.42 (s, 2H, H-2 and H-5), 4.03 (s, 2H, H-3 and H-4), 3.32 (m, 4H, H-1' and H-7'), 2.80 (m, terminal CONH—CH$_2$), 2.46 (broad s, 4H, H-3' and H-5'), 2.23 (s, 3H, N—C$\underline{H}_3$), 1.73 (broad s, 4H, H-2' and H-6').

Anal. Calcd for C$_{13}$H$_{25}$N$_3$O$_6$ (319.35): C, 48.89; H, 7.89; N, 13.16. Found: C, 48.76; H, 7.92; N, 13.17.

EXAMPLE D

Poly (3,6-dioxaoctamethylene galactaramide).

To methanol (50 mL) was added dimethyl galactarate (5.0 g, 21.0 mmol) and 3,6-dioxaoctamethylenediamine (triethyleneglycoldiamine, Jeffamine EDR148, Texaco, 1.631 M, 13.0 mL, 21.0 mmol) and triethylamine (3.0 mL, 2.19 g, 21.5 mmol). The reaction mixture was refluxed for 8 h. The precipitate was removed by filtration, washed with fresh methanol (2×10 mL) and dried under vacuum to give 5.7 g (84%) of poly(3,6-dioxaoctamethylene galactaramide) as a white amorphous powder: mp 190°-200° C. (decomp); IR (KBr) 3295 cm$^{-1}$ (broad, O—H and N—H stretch), 2941 and 2872 (C—H stretch), 1641 (Amide I, C=O stretch), 1545 (Amide II, N—H bend); $^1$H NMR (D$_2$O) δ 4.45 (s, 2H, H-2 and H-5), 4.05 (s, 2H, H-3 and H-4), 3.71 (m, 8H, H-1', H-4, H-5' and H-8'), 3.50 (s, 4H, H-2' and H-7') 2.96 (m, terminal CONH—CH$_2$).

Anal. Calcd for $\overline{C}_{12}$H$_{22}$N$_2$O$_8$ (322.31): C, 44.72; H, 6.88; N, 8.69. Found: C, 44.34; H, 6.96; N, 8.85.

EXAMPLE 1

Preparation of oxygen-hetero-poly(alkylene aldaramides).

Poly (3,6-dioxaoctamethylene D-glucaramide)

Triethylamine (0.5 mL) and a methanol solution of 1.631 M 3,6-dioxaoctamethylenediamine (triethyleneglycoldiamine, EDR 148, 6.24 mL, 10.2 mmol, 1.05:1 molar ratio of diamine to lactone Texaco) was added to a methanol (40 mL) solution of methyl D-glucarate 1,4-lactone (2.000 g, 9.70 mmol). The colorless solution was stirred at room temperature and within 30 min, a precipitate began to form. The initial precipitate had an oily consistency and stuck to the walls of the reaction flask, but over time with stirring, the oil solidified and could be easily scraped from the wall of the reaction flask. Because the precipitation process was slow, stirring was normally allowed to continue for 48 h before the solid was removed. The white solid product was dried at a reduced pressure (0.25 torr) at 75° C. for 36 h to give poly(3,6-dioxaoctamethylene D-glucaramide), yield 1.944 g (6.03 mmol, 62.2%); mp softened at 110° C. and completely liquified by 150° C.; IR (KBr) 3309 cm$^{-1}$ (O—H, stretch), 2876 cm$^{-1}$ (C—H, stretch), 1645 cm$^{-1}$ (Amide I, C=O), 1542 cm$^{-1}$ (Amide II, N—H stretch); $^1$H NMR (D$_2$O) δ4.351 (d, 1H, H-2, J$_{2,3}$=2.31 Hz), 4.116 (t, 1H, H-3, J$_{3,4}$=4.55 Hz), 3.979 (t, 1H, H-4, J$_{4,5}$=5.16 Hz), 4.274 (d, 1H, H-5), 3.702 (s, 4H, —O—CH$_2$—CH$_2$—O—), 3.669 (t, 4H, N—C—C$\underline{H}_2$—O—), 3.474 (broad s, 4H, —NH—C$\underline{H}_2$—), 2.915 (t, —C$\underline{H}_2$NH$_2$).

Anal. Calcd for [C$_{12}$H$_{22}$N$_2$O$_8$]$_n$: C, 44.72; H, 6.88; N, 8.69. Found: C, 44.05; H, 6.98; N, 8.28.

EXAMPLE 2

Preparation of nitrogen-hetero-poly(alkylenealdaramides).

Poly (4-aza-4-methylheptamethylene D-glucaramide).

Triethylamine (0.5 mL) and a methanol solution of 1.53 M 4-aza-4-methylheptamethylenediamine (3,3-diamino-N-methyldipropylamine, 6.34 mL, 9.70 mmol) were added to a methanol solution of methyl D-glucarate 1,4-lactone (60 mL, 2,000 g., 9.70 mmol). The colorless solution was stirred at room temperature and within 20 min the reaction mixture became cloudy and a thick and slightly yellow syrup was formed on the bottom of the flask. The mixture was stirred at room temperature for 24 h and concentrated at 50° C. to give a syrup. The syrup was stirred with methanol ( 20 mL) for 4 h, the methanol layer decanted and the insoluble syrup dried at reduced pressure (0.25 torr) and 75° C. for 6 h to give amorphous poly(4-aza-4-methylheptamethylene D-glucaramide) ( 2.43 g, 7.63 mmol, 78.6%): mp softened at 100° C. and completely liquified by 120° C.; IR (KBr) 3422 cm$^{-1}$ (O—H, stretch), 2945 cm$^{-1}$ (C—H, stretch), 1646 cm$^{-1}$ (Amide I, C=O), 1541 cm$^{-1}$ (Amide II, N—H bend); $^1$H NMR (D$_2$O) δ4.32 (s, 1H, H-2), 4.23 (d, 1H, H-5), 4.10 (s, 1H, H-3), 3.97 (t, 1H, H-4), 3.27 (s, 4H, H-1' and H-7'), 2.47 (s, 4H, H-3' and H-5'), 2.24 (s, 3H, —CH$_3$), 1.74 (s, 4H, H-2' and H-6').

Anal. Calcd for C$_{13}$H$_{25}$N$_3$O$_6$(319.36): C, 48.89; H, 7.89; N, 13.16. Found: C, 48.38; H, 7.85; N, 12.91.

EXAMPLE 3

Poly (3,6-dioxaoctamethylene xylaramide

To methanol (50 mL) was added methanol esterified xylaric acid (0.25M, 16.0 mL, 4.00 mmol) and 3,6-dioxaoctamethylene diamine (592 mg, 4.00 mmol). The reaction mixture was stirred for 6 h at room temperature. The reaction was concentrated under reduced vacuum to give poly(3,6-dioxaoctamethylene xylaramide) (0.92 g, 85%) as a syrup. Trituration with acetone did not give a solid.

EXAMPLE 4

Approximately 100 mg of each of the polymers prepared in the manner of Examples C, D, and 1–3 and selected polymers of U.S. Pat. No. 4,833,230 was dissolved in 1.0 mL of deionized water. From this half of the volume was applied to a microscope slide and dispersed as much as possible. The slide was then placed in an oven, preheated to 60° C., for one hour. The slides were allowed to cool to room temperature. The general appearance of each residue was noted. If the residue was transparent and smooth then it was classified as a film. If the residue was transparent and cracked it was classified as a cracked film. If the residue was not transparent it was classified as crystalline. The results are tabulated in Table I below. It can be seen that poly(3,6-dioxaoctamethylene o-glucaramide) (Example 1) and poly(4-aza-4-methylheptamethylene D-glucaramide) (Example 2) and poly(3,6-dioxaoctamethylene xylaramide) (Example 3) yielded clear films but poly(4-aza-4-methylheptamethylene galactaramide) (Example C) and poly(3,6-dioxaoctamethylene galactaramide) (Example D) formed cracked films.

EXAMPLE 5

Using the same solutions of polymers as in Example 4, using a nine inch disposable pipet, two drops of the polymer solution were placed on the center of a microscope slide. On this was placed, at 90° C., a second microscope slide which spread the liquid evenly between the two glass surfaces. The slides were warmed in an oven, preheated to 60° C., for 10 hours. The slides were allowed to cool to room temperature, then pulled apart and a qualitative assessment of the relative forces required to separate the slides was made. The results expressed in the range from 0 (no adhesion) to ++ (strong adhesion) are shown in Table I below.

xylaramide)-co-(4-aza-4methylheptamethylene D-glucaramide).

To methanol (50 mL) was added methanol esterified xylaric acid (0.25M methanol solution, 8.0 mL, 2.0 mmol) and 4-aza-4-methylheptamethylenediamine (464 mg, 4.0 mmol). The reaction mixture was stirred for 3 h at room temperature and then a methanol solution (10 mL) of methyl D-glucarate 1,4-lactone (412 mg, 2.0 mmol) was added. The reaction mixture was then stirred for an additional 6 h at room temperature and concentrated under reduced pressure to give 1.03 g (85%) of poly(4'-aza-4'-methylheptamethylene xylaramide)-co-(4'-aza-4'-methylheptamethylene D-glucaramide) as a glass, which on trituration with acetone did not yield a solid.

EXAMPLE 7

Synthesis of blocked copolymer polyamides utilizing esterified glucaric acid, esterified galactaric acid and one diamine Poly(4-aza-4-methylheptamethylene D-glucaramide)-co-(4-aza-4-methylheptamethylene galactaramide).

To methanol (50 mL) was added methyl D-glucarate 1,4-lactone (412 mg, 2.0 mmol) and 4-aza-4-methylheptamethylenediamine (580 mg, 4.0 mmol). The reaction mixture was stirred for 3 h at room temperature and then 25.0 mL of a methanol solution of dimethyl galactarate (476 mg, 2.0 mmol) and triethylamine (10 drops) was added. The reaction mixture was stirred for an additional 6 h at room temperature and then concentrated under reduced pressure to give a syrup which upon trituration with acetone gave 1.07 g (88%) of poly (4-aza-4-methylheptamethylene D-glucaramide)-co-(4-aza-4-methylheptamethylene galactaramide) as a solid, mp 180° C. (d).

EXAMPLE 8

Synthesis of blocked copolymer polyamides utilizing esterified xylaric acid, a second esterified aldaric acid

TABLE I
FILM AND ADHESIVE EVALUATION

| GLU | XYL | GAL | C2 | C4 | C6 | C12 | MPHDA | 33NME | EDR148 | RESULT FILM | ADHESIVE |
|---|---|---|---|---|---|---|---|---|---|---|---|
| X | — | — | X | — | — | — | — | — | — | CF | |
| X | — | — | — | X | — | — | — | — | — | CF | |
| X | — | — | — | — | X | — | — | — | — | PPT | |
| X | — | — | — | — | — | X | — | — | — | PPT | |
| X | — | — | — | — | — | — | X | — | — | F | + |
| X | — | — | — | — | — | — | — | — | X | F | ++ |
| X | — | — | — | — | — | — | — | X | — | F | ++ |
| — | — | X | — | — | X | — | — | — | — | PPT | |
| — | — | X | — | — | — | X | — | — | — | PPT | |
| — | — | X | — | — | — | — | X | — | — | PPT | 0 |
| — | — | X | — | — | — | — | — | — | X | CF | 0 |
| — | — | X | — | — | — | — | — | X | — | CF | 0 |
| — | X | — | — | — | — | — | X | — | — | F | ++ |
| — | X | — | — | — | — | — | — | X | — | F | |
| — | X | — | — | — | — | — | — | — | X | F | |

C2, C4, C6, C12 and MPMDA are polymers of U.S. Pat. No. 4,833,230 having ethyteriediamine, tetramethytenediainine, hexamethylenediamine, dodecamethytenediamine and methyipentamethyienediamine residues respectively
33NME and EDR148 are polymers having 4-aza-4-methytheptamethytene and 3,6-dioxaoctamethytene residues respectively
F = FILM
CF = CRACKED FILM
PPT = CRYSTALLINE

EXAMPLE 6

Synthesis of blocked copolymer polyamides utilizing esterified xylaric acid, a second esterified aldaric acid and one diamine Poly(4-aza-4-methylheptamethylene and at least two diamines
Poly(2-methylpentamethylene xylaramide)-co-(3,6-dioxaoctamethylene D-glucaramide).

To methanol (50 mL) was added methanol esterified xylaric acid (0.25M methanol solution, 8 mL, 2.0 mmol). To this solution was added 2-methylpentamethylenediamine (232 mg, 2.0 mmol) and the reaction mixture was stirred at room temperature for 3 h. To this solution was added methyl D-glucarate 1,4-lactone (412 mg, 2.0 mmol). The reaction was stirred for an additional 2 h at room temperature. A second diamine, 3,6-dioxaoctamethylenediamine (296 mg, 2.0 mmol), was added, the reaction mixture stirred at room temperature for an additional 6 h and then the reaction mixture was concentrated under reduced pressure to give 1.00 g (92%) of poly(2-methylpentamethylene xylaramide)-co-(3,6-dioxaoctamethylene D-glucaramide) as a syrup which upon trituration with acetone did not yield a solid.

EXAMPLE 9

Synthesis of blocked copolymer polyamides utilizing esterified glucaric acid, esterified galactaric acid and at least two diamines
Poly(2-methylpentamethylene D-glucaramide)-co-(3,6-dioxaoctamethylene galactaramide).

To methanol (50 mL) was added methyl D-glucarate 1,4-lactone (412 mg, 2.0 mmol). To this solution was added 2-methylpentamethylenediamine (232 mg, 2.0 mmol) and the reaction mixture was stirred at room temperature for 3 h. To this solution was added 25.0 mL of a methanol solution of dimethyl galactarate (476 mg, 2.0 mmol) and triethylamine (10 drops). The reaction was stirred for an additional 2 h at room temperature. A second diamine, 3,6-dioxaoctamethylenediamine (296 mg, 2.0 mmol), was added, the reaction mixture stirred at room temperature for an additional 6 h and then concentrated under reduced pressure to give a glassy material which upon trituration with acetone gave 1.00 g (86%) of poly(2-methylpentamethylene D-glucaramide)-co-(3,6-dioxaoctamethylene galactaramide) as a solid, mp 95°–100° C.

EXAMPLE 10

Procedure for the testing of the cardboard adhesive capabilities of water soluble carbohydrate based polyamides A 25 to 50 mg sample of each polymer listed in Table II was heated until it began to soften or flow. The melt was then placed quickly onto the center of a piece of cardboard (5 cm × 10 cm). To this was placed, at 90° C., a second piece of cardboard. The pieces of cardboard were then gently heated with a heat gun and pressed together. The pieces of cardboard were then allowed to cool to room temperature and pulled apart. A qualitative assessment of the force required was made. If the polymer did not adhere to the cardboard a rating of (0) was given. Where the pieces of stuck cardboard separated but did not rip, a rating of (+ to +++) was given. In cases where the cardboard ripped in separating the two pieces, the rating given the polymer was (++++ to ++++++).

The test results are given below in Table II.

TABLE II

ADHESIVE RESULTS FROM WATER SOLUBLE CARBOHYDRATE BASED POLYAMIDES ON CARDBOARD

| Preparation Method Example | Aldaric Acid | Diamine | Adhesive Results |
|---|---|---|---|
| 1 | Glu | EDR148 | ++++# |
| 2 | Glu | 33NMe | +++++# |
| 6 | Xyl and Glu (1:1) | 33NMe | ++++# |
| 6 | Xyl and Glu (1:1) | EDR148 | ++++# |
| 7 | Glu and Gal (1:1) | EDR148 | ++++# |

TABLE II-continued

ADHESIVE RESULTS FROM WATER SOLUBLE CARBOHYDRATE BASED POLYAMIDES ON CARDBOARD

| Preparation Method Example | Aldaric Acid | Diamine | Adhesive Results |
|---|---|---|---|
| 7 | Glu and Gal (1:1) | 33NMe | +* |
| 7 | Xyl and Gal (1:1) | EDR148 | ++++++# |
| 7 | Xyl and Gal (1:1) | 33NMe | +* |
| 7 | Xyl and Gal (1:1) | MPMDA and EDR148 (1:1) | +++* |
| 8 | Xyl and Glu (1:1) | MPMDA and EDR148 (1:1) | +++++# |
| 9 | Glu and Gal (1:1) | MPMDA and EDR148 (1:1) | +* |
| 3 | Xyl | 33NMe | ++++++# |
| 3 | Xyl | EDR148 | ++* |

The cardboard was ripped but the glued bond between the cardboard pieces held.
*The pieces of cardboard separated at the point where they were glued but were not ripped.

We claim:
1. Film-forming and adhesive aldaramide polymers having the general formula:

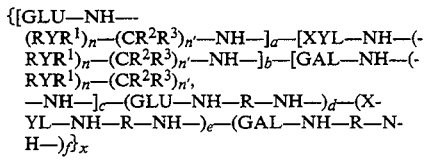

wherein GLU is

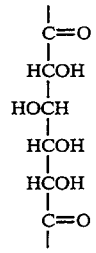

XYL is

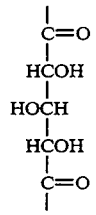

and GAL is

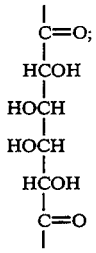

each of a, b and c may be zero and the sum a+b+c must be greater than zero, with the proviso that the value of c cannot be greater than the sum a+b;

each of d, e and f may be zero and the sum d+e+f must be no greater than the sum a+b+c;

each individual n is individually 1 or 2;

each individual R is selected individually from the group of divalent radicals consisting of alkylene, alkenylene, aryl- and alkyl-substituted alkylene and alkenylene, and —$R^4$-(arylene)-$R^4$— and —$R^4$-(alkyl- and alkenyl-substituted arylene)-$R^4$—, where each individual $R^4$ is selected individually from the group consisting of alkylene having from 1–4 carbon atoms;

each individual $R^1$ is selected individually from the group consisting of R or a valence bond;

each individual $R^2$ and $R^3$ is selected individually from the group consisting of hydrogen, alkyl, alkenyl, alkynyl, aryl, aryl-substituted alkyl and alkenyl, and alkyl- and alkenyl-substituted aryl;

each individual n' may individually be zero or an integer from 1 to 3 with the proviso that when $R^1$ is a valence bond n' must be at least two;

each individual Y is selected individually from the group consisting of —O—, —S—, —$NR^5$—, and —$PR^5$—, wherein each individual $R^5$ is selected individually from the group consisting of hydrogen, alkyl, alkenyl, aryl, aralkyl and alkaryl; and x is a number between about 10 and about 1,000.

2. Film-forming and adhesive aldaramide polymers having the general formula:

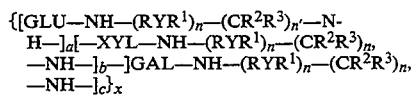

wherein GLU is

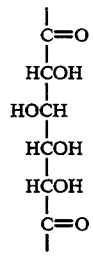

XYL is

and GAL is

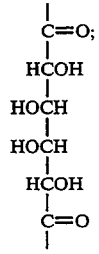

each of a, b and c may be zero and the sum a+b+c must be greater than zero, with the proviso that the value of c cannot be greater than the sum a+b;

each individual n is individually 1 or 2;

each individual R is selected individually from the group of divalent radicals consisting of alkylene, alkenylene, aryl- and alkyl-substituted alkylene and alkenylene, and —$R^4$-(arylene)-$R^4$— and —$R^4$-(alkyl- and alkenyl-substituted arylene)-$R^4$—, where each individual $R^4$ is selected individually from the group consisting of alkylene having from 1–4 carbon atoms;

each individual $R^1$ is selected individually from the group consisting of R or a valence bond;

each individual $R^2$ and $R^3$ is selected individually from the group consisting of hydrogen, alkyl, alkenyl, alkynyl, aryl, aryl-substituted alkyl and alkenyl, and alkyl- and alkenyl-substituted aryl;

each individual n' may individually be zero or an integer from 1–3 with the proviso that when $R^1$ is a valence bond n' must be at least two;

each individual Y is selected individually from the group consisting of —O—, —S—, —$NR^5$—, and —$PR^5$—, wherein each individual $R^5$ is selected individually from the group consisting of hydrogen, alkyl, alkenyl, aryl, aralkyl and alkaryl; and x is a number between about 10 and about 1,000.

3. A polymer of claim 1 wherein c and f are zero.

4. A polymer of claim 1 wherein b, c, e and f are zero.

5. A polymer of claim 2 wherein c is zero.

6. A polymer of claim 2 wherein a and c are zero.

7. Film-forming and adhesive glucaramide polymers having the general formula:

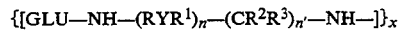

wherein GLU is

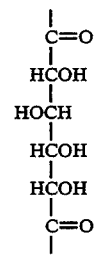

n is 1 or 2;

R is selected from the group of divalent radicals consisting of alkylene, alkenylene, aryl- and alkyl-substituted alkylene and alkenylene, and —$R^4$-

(arylene)-R$^4$— and —R$^4$-(alkyl- and alkenyl-substituted arylene)-R$^4$—, where each individual R$^4$ is selected individually from the group consisting of alkylene having from 1–4 carbon atoms;

R$^1$ is selected individually from the group consisting of R or a valence bond;

each individual R$^2$ and R$^3$ is selected individually from the group consisting of hydrogen, alkyl, alkenyl, alkynyl, aryl, aryl-substituted alkyl and alkenyl, and alkyl- and alkenyl-substituted aryl;

n' may individually be zero or an integer from 1–3 with the proviso that when R$^1$ is a valence bond n' must be at least two;

Y is selected from the group consisting of —O—, —S—, —NR$^5$—, and —PR$^5$—, wherein is selected individually from the group consisting of hydrogen, alkyl, alkenyl, aryl, aralkyl and alkaryl; and x is a number between about 10 and about 1,000.

8. A polymer of claim 7 wherein Y is —O—.
9. A polymer of claim 7 wherein Y is —NR$^5$—.
10. A polymer of claim 9 wherein R$^5$ is methyl.

* * * * *